US008974138B2

(12) United States Patent
Liao

(10) Patent No.: US 8,974,138 B2
(45) Date of Patent: Mar. 10, 2015

(54) FAST DISASSEMBLY FASTENING APPARATUS FOR MUSICAL INSTRUMENTS

(76) Inventor: Tsun-Chi Liao, Taichung (TW)

(*) Notice: Subject to any disclaimer, the term of this patent is extended or adjusted under 35 U.S.C. 154(b) by 256 days.

(21) Appl. No.: 13/432,366

(22) Filed: Mar. 28, 2012

(65) Prior Publication Data

US 2013/0256482 A1 Oct. 3, 2013

(51) Int. Cl.
*F16B 21/00* (2006.01)
*G10D 13/02* (2006.01)

(52) U.S. Cl.
CPC .................................... *G10D 13/026* (2013.01)
USPC ............................................. 403/330; 84/421

(58) Field of Classification Search
CPC ......... F16B 2/10; G10D 13/06; G10D 13/065
USPC ......... 403/326, 327, 328, 330; 84/421, 422.3, 84/453
See application file for complete search history.

(56) References Cited

U.S. PATENT DOCUMENTS 5,477,709 A * 12/1995 Rowe .............................. 68/212
5,749,691 A * 5/1998 Campbell ...................... 411/433
5,785,480 A * 7/1998 Difeo ............................ 411/433
6,212,917 B1 * 4/2001 Rathbun .......................... 68/212
6,523,799 B2 * 2/2003 Su ................................ 248/404
7,176,368 B2 * 2/2007 Takegawa .................... 84/422.3
7,479,593 B1 * 1/2009 Townsend ........................ 84/421
7,629,526 B1 * 12/2009 Miyajima .................... 84/422.1
8,167,259 B2 * 5/2012 Spang et al. ............... 248/230.4
8,471,133 B1 * 6/2013 Lin ................................ 84/421

FOREIGN PATENT DOCUMENTS

GB 2 270 192 A * 3/1994 ............ G10D 13/06

* cited by examiner

*Primary Examiner* — Michael P Ferguson
(74) *Attorney, Agent, or Firm* — Muncy, Geissler, Olds & Lowe, P.C.

(57) ABSTRACT

A fast disassembly fastening apparatus mounted onto a bracing post includes a mounting seat, a press portion, a latch portion and an elastic portion. The mounting seat has a housing compartment with an aperture run through by the bracing post. The latch portion is hinged in the housing compartment and has a fixed position intruding into the aperture and a release position escaping from the aperture. The elastic portion is compressed to push the latch portion to the fixed position. The press portion is inserted into the housing compartment to contact the latch portion and push the latch portion to the release position. By pressing the press portion, the bracing post runs through the aperture. After the press portion is released, the elastic portion pushes the latch portion to latch the bracing post so that the mounting seat is held on the bracing post to fix a musical instrument.

8 Claims, 7 Drawing Sheets

FAST DISASSEMBLY FASTENING APPARATUS FOR MUSICAL INSTRUMENTS

FIELD OF THE INVENTION

The present invention relates to a fastening apparatus for musical instruments and particularly to a fast disassembly fastening apparatus for musical instruments.

BACKGROUND OF THE INVENTION

A conventional musical instrument fastening apparatus, such as one for fixing cymbals as shown in FIG. 1, mainly includes a post 1 fastened to a cymbal stand 5 to hold a cymbal 3. The top of the post 1 runs through two felts 2 with the cymbal 3 sandwiched therebetween, and the post 1 is fastened by a fastening nut 4 to securely hold the two felts 2. The felts 2 are made from pliable material and can absorb vibration to improve the timbre of the cymbal 3.

While the aforesaid structure can generate sound by striking the cymbal 3, in the event that removing the cymbal 3 is desired, the fastening nut 4 has to be unfastened first, more time and efforts are needed for unfastening and refastening again, hence it cannot fully meet use requirements. Moreover, the fastening nut 4 is fastened by wrenching, hence is prone to wearing off and loosening after repetitive fastening and unfastening, and cannot securely hold the felts 2 and cymbal 3 and result in forming gaps between them and not effective vibration absorption. The timbre of the cymbal 3 could also be changed and become undesirable upon striking. There are still rooms for improvement.

SUMMARY OF THE INVENTION

Therefore, the primary object of the present invention is to provide a fast disassembly fastening apparatus for musical instruments to meet requirements of fast changing the musical instruments.

To achieve the foregoing object, the fast disassembly fastening apparatus of the invention is mounted onto a bracing post and includes a mounting seat, a latch portion, an elastic portion and a press portion. The mounting seat has a housing compartment with an aperture run through by the bracing post. The latch portion is hinged in the housing compartment and has a fixed position intruding into the aperture and a release position escaping from the aperture. The elastic portion is compressed inside the housing compartment to push the latch portion to the fixed position. The press portion is inserted into the housing compartment from an exterior of the mounting seat to contact the latch portion and is depressible to push the latch portion to reach the release position.

Thus, by pressing the press portion, the latch portion can be pushed to move to the release position with the bracing post running through the aperture; and after the press portion is released, the elastic force of the elastic portion can push the latch portion to reach the fixed position, and then the latch portion can latch the bracing post so that the mounting seat can be securely held on the bracing post to fix a musical instrument. The fastening structure thus formed is operable by pushing the press portion, thus can perform fastening and unfastening quickly to meet use requirements.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
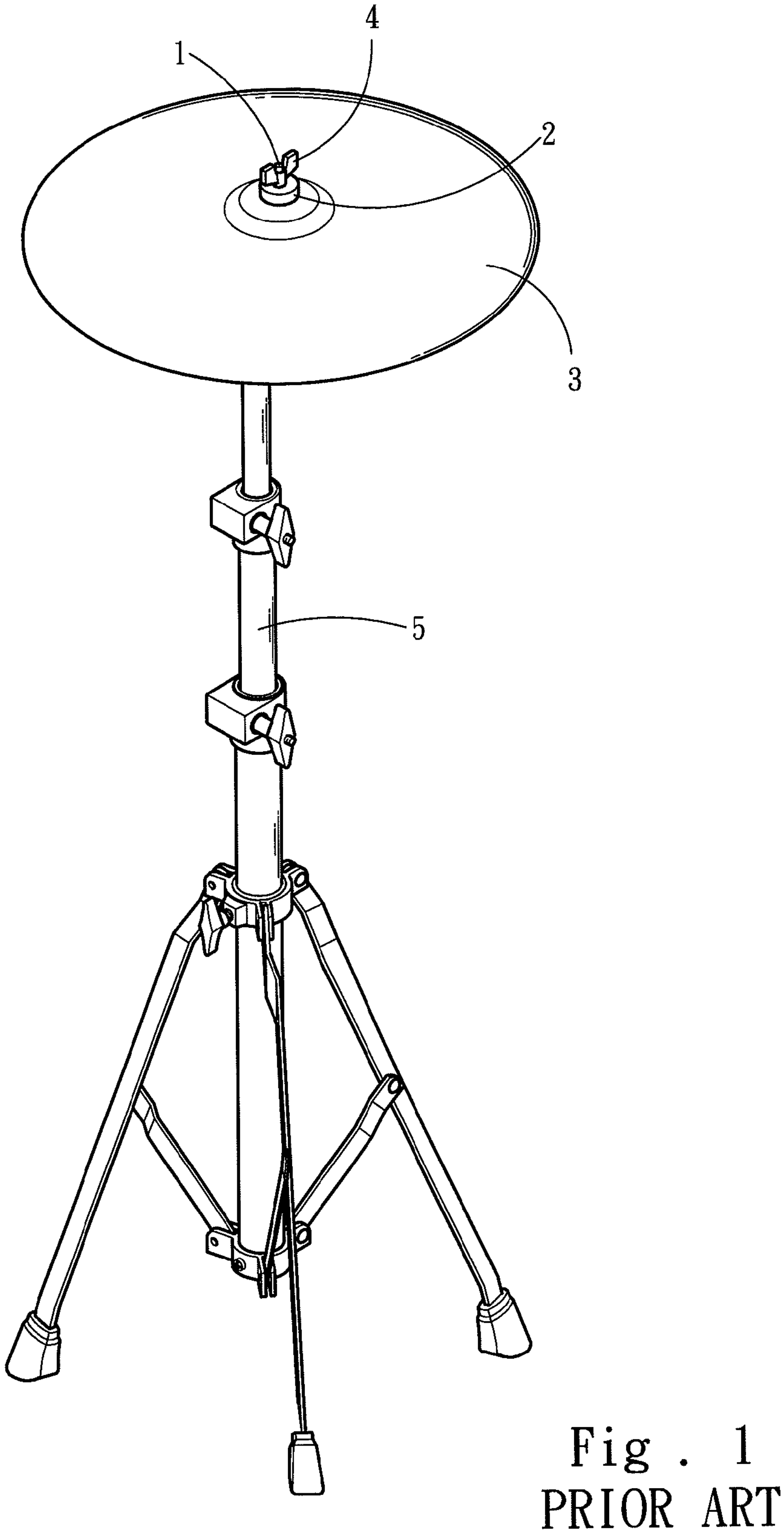
Fig. 1 PRIOR ART
FIG. 1 is a schematic view of a conventional fast disassembly fastening apparatus for musical instruments.
Figure 2:
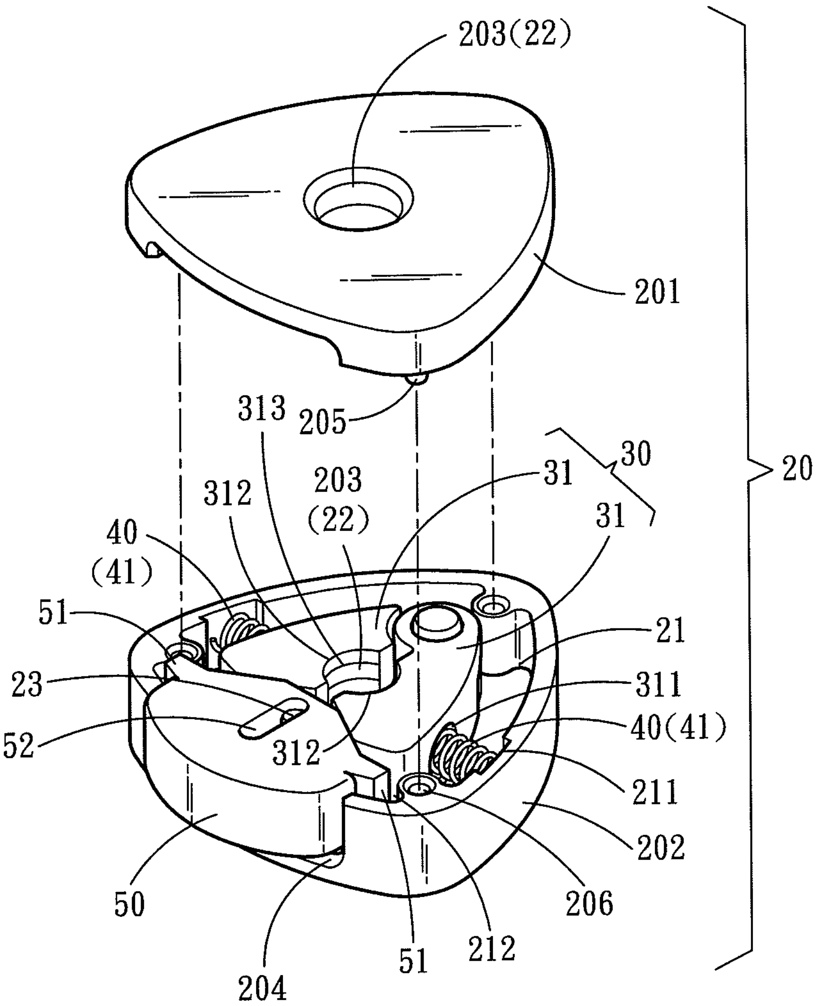
FIG. 2 is a perspective view of the invention.
Figure 3:
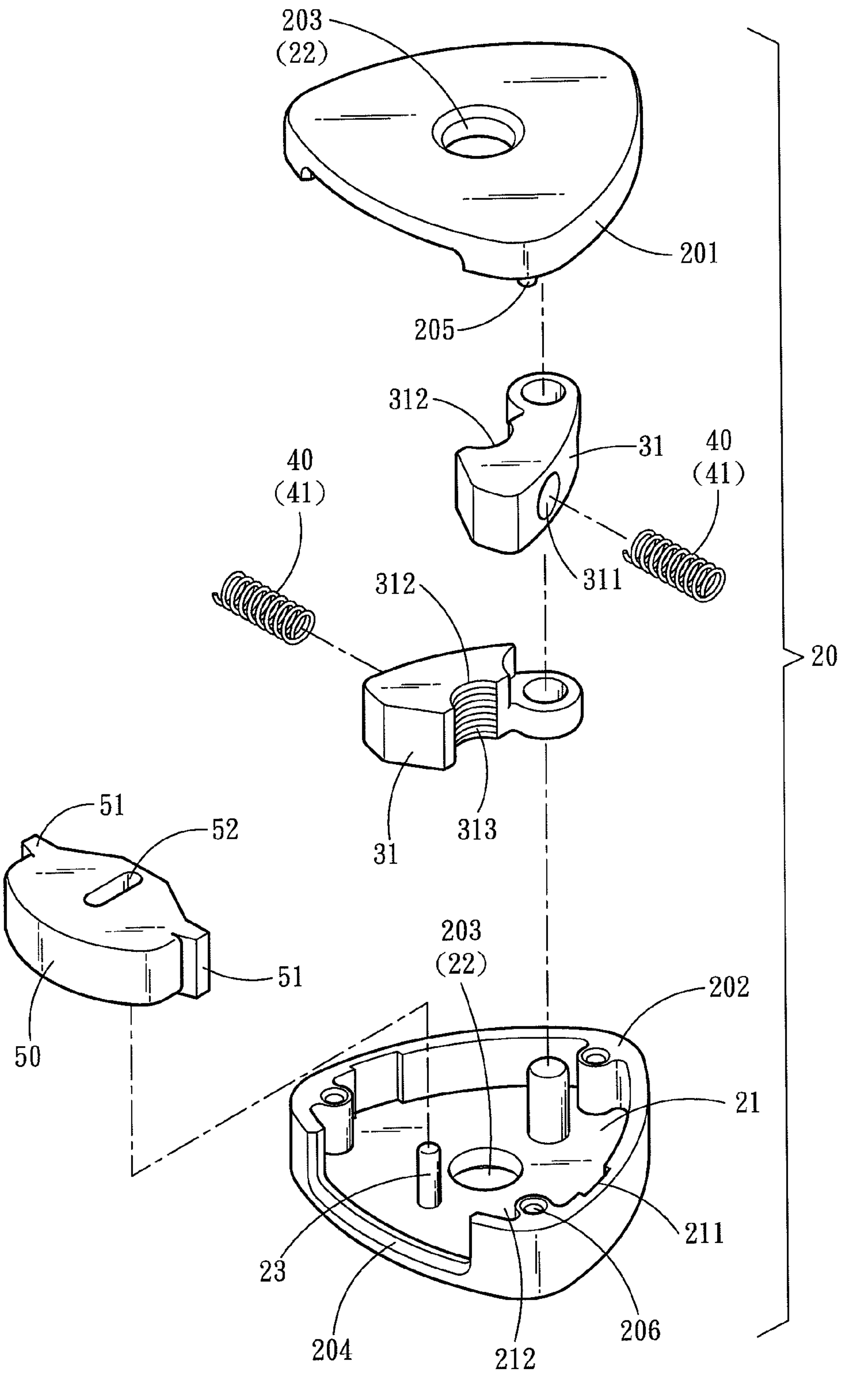
FIG. 3 is an exploded view of the invention.
Figure 4:
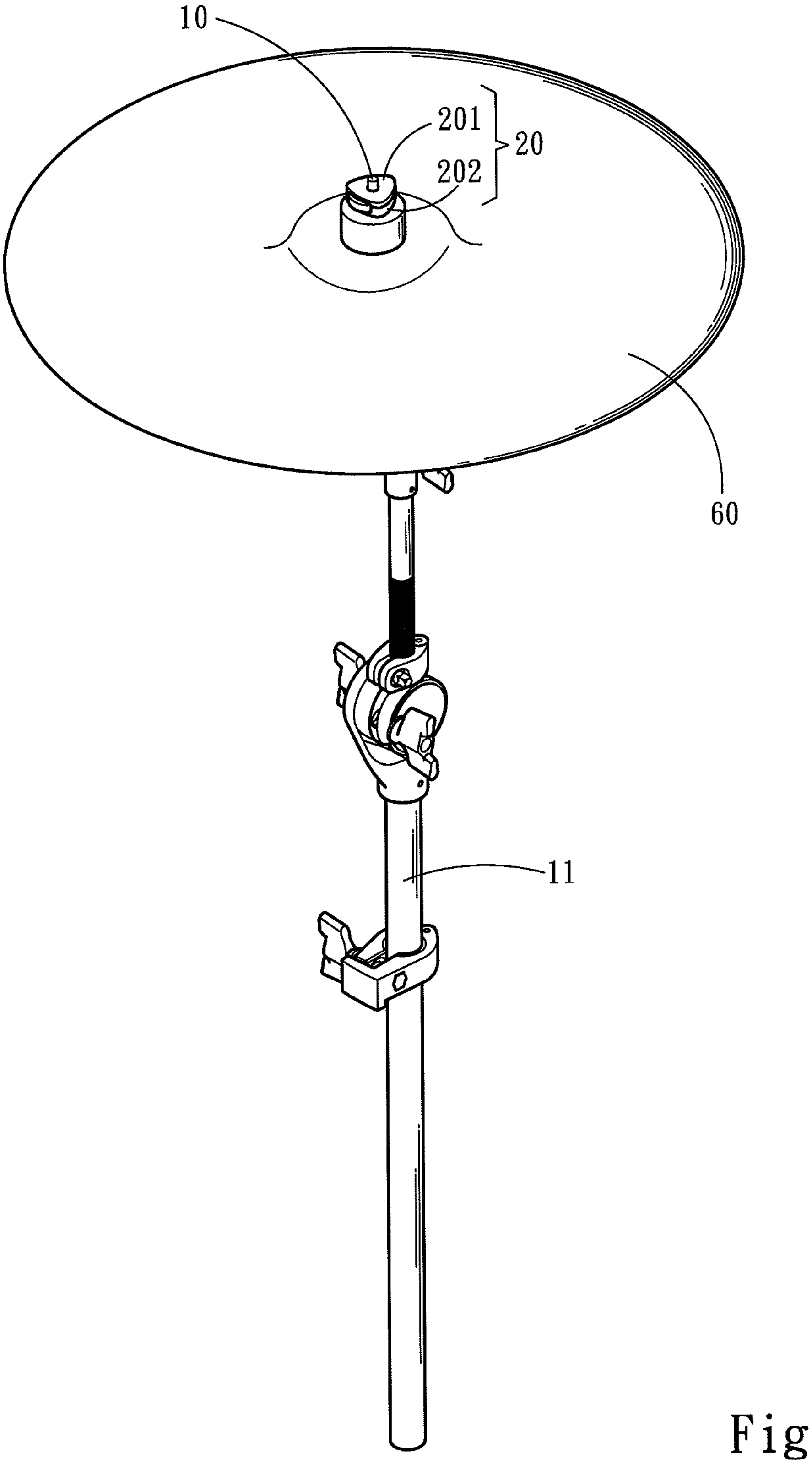
FIG. 4 is a schematic view of the invention in a use condition to clamp a musical instrument.

Please refer to FIGS. 2, 3 and 4, the present invention aims to provide a fast disassembly fastening apparatus for musical instruments that is mounted onto a bracing post 10 connecting to a musical instrument stand 11. The fastening apparatus of the invention includes a mounting seat 20, a latch portion 30, an elastic portion 40 and a press portion 50. The mounting seat 20 has a housing compartment 21 with an aperture 22 run through by the bracing post 10, a cap 201 to latch on the mounting seat 20 and a base 202. The housing compartment 21 is formed on the base 202 and sealed by the cap 201. The cap 201 and base 202 have respectively an opening 203 corresponding to each other with the aperture 22 formed thereon. The base 202 has a notch 204 at one side run through by the press portion 50. The cap 201 and base 202 also have respectively at least one latch strut 205 and one latch cavity 206 formed thereon mating each other for latching together, thereby to couple the cap 201 and base 202 together.

The latch portion 30 is hinged in the housing compartment 21 and has a fixed position intruding into the aperture 22 and a release position escaping from the aperture 22. The latch portion 30 includes two clamp jaws 31 hinged about axle strut 24 in the housing compartment 21 and located at two sides of the aperture 22.

The elastic portion 40 is compressed inside the housing compartment 21 to push the latch portion 30 to the fixed position. The elastic portion 40 may include two elastic elements 41 corresponding to the two clamp jaws 31 for pushing thereof so that the latch portion 30 is moved to the fixed position. The housing compartment 21 and each clamp jaw 31 have respectively a recess 211 and a cavity 311 to hold one elastic element 41. Each clamp jaw 31 has an arched latch basin 312 facing one side of the aperture 22 and having a latch thread 313 formed thereon to enhance clamping strength on the bracing post 10.

The press portion 50 is inserted through the notch 204 into the housing compartment 21 from an exterior of the mounting seat 20 to contact the latch portion 30 and is depressible to push the latch portion 30 to the release position. The press portion 50 has a latch flange 51 on each of two ends, and the housing compartment 21 has two latch recesses 212 mating the latch flanges 51 to increase pressing precision. The press portion 50 also may have a guide slot 52 while the mounting seat 20 has a guide strut 23 mating and inserting into the guide slot 52 to slide therein to guide moving direction of the press portion 50.

Figure 5A:
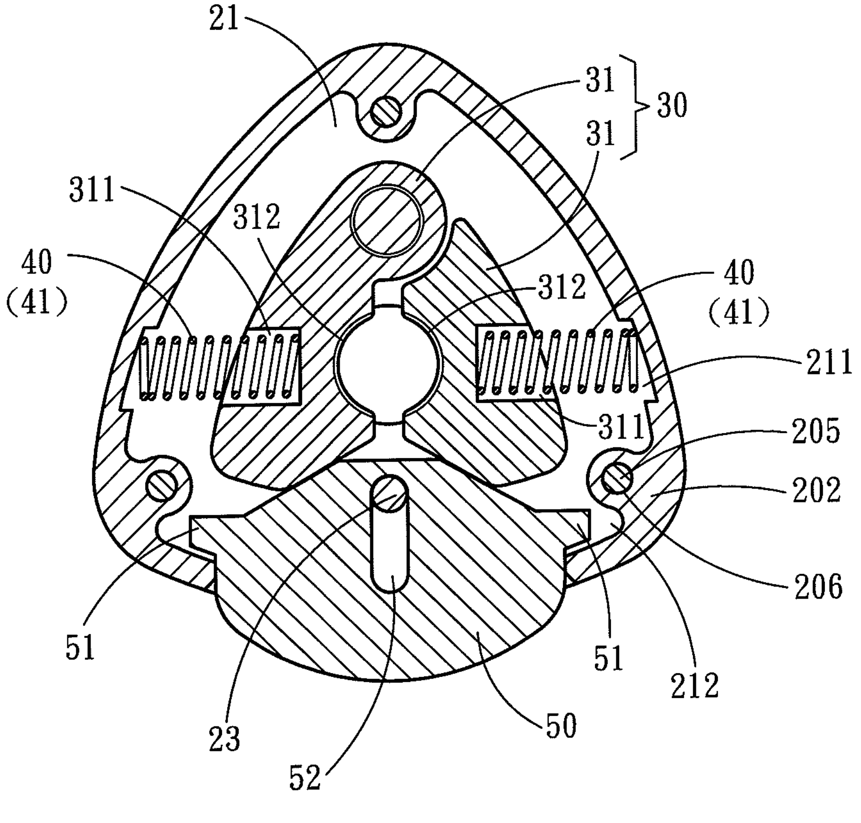
FIG. 5A is a schematic view of the invention in use condition-1.
Figure 5B:
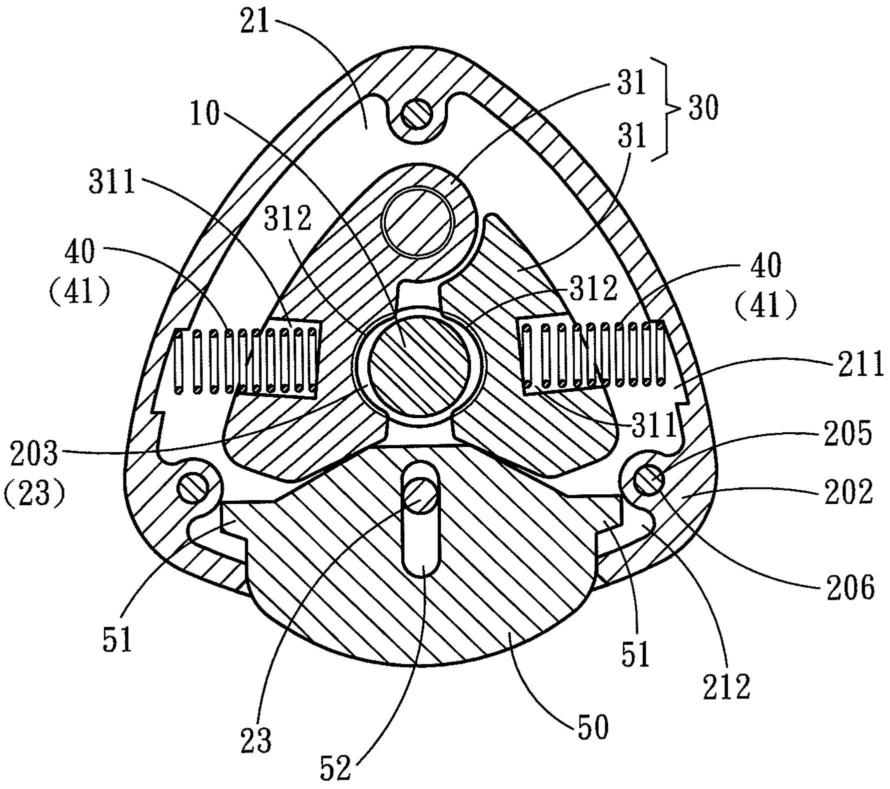
FIG. 5B is a schematic view of the invention in use condition-2.
Figure 5C:
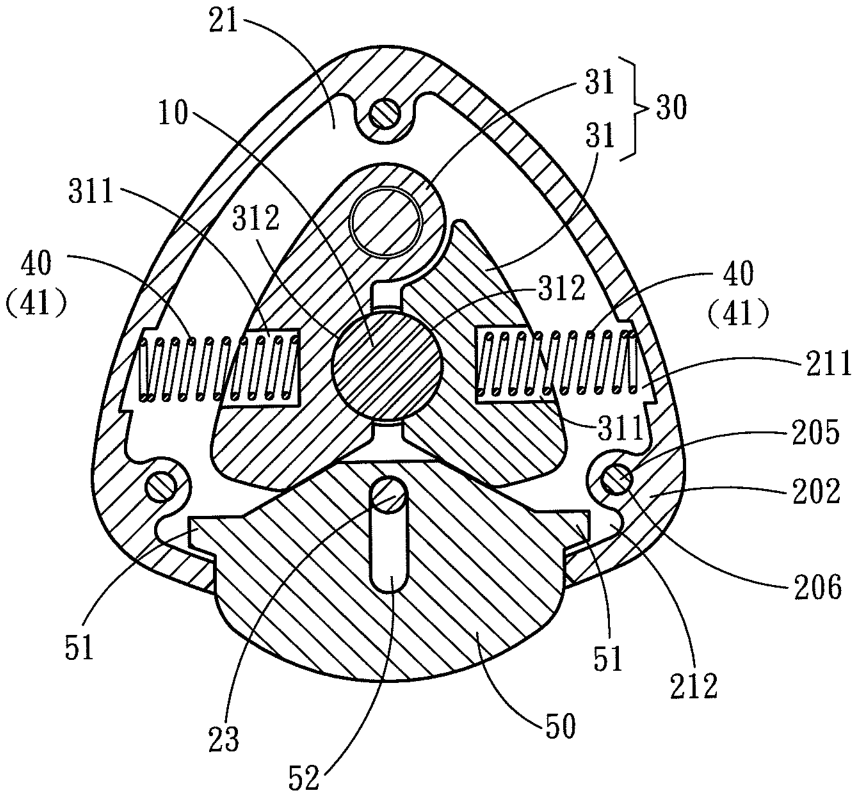
FIG. 5C is a schematic view of the invention in use condition-3.

Referring to FIGS. 5A, 5B and 5C, when in use and before the press portion 50 is pressed, referring to FIG. 5A, the latch portion 30 (the two clamp jaws 31) is at the fixed position, and the latch portion 30 (the two clamp jaws 31) intrudes into the aperture 22, hence the bracing post 10 cannot run through the aperture 22. Then pressing the press portion 50, the latch portion 30 (the two clamp jaws 31) is pushed to move to the release position and escapes from the aperture 22 as shown in FIG. 5B, and then the bracing post 10 can run through the aperture 22. Next, releasing the press portion 50, the latch portion 30 (the two clamp jaws 31) is pushed by the elastic force of the elastic portion 40 (the two elastic elements 41) to the fixed position to clamp the bracing post 10 as shown in FIG. 5C, thereby the mounting seat 20 can be securely held on the bracing post 10.

As a conclusion, by pushing the press portion 50 clamping of the latch portion 30 (latch jaws 31) on the bracing post 10 can be controlled. The fastening structure thus formed provides fast disassembly and assembly with simple operation, thus an instrument 60 (referring to FIG. 4) can be quickly mounted or removed to meet use requirement without wearing away of the fastening apparatus easily.

What is claimed is:

1. A fast disassembly fastening apparatus for musical instruments mounted onto a bracing post, comprising:

a mounting seat including a housing compartment which includes a bottom surface and a aperture located on the bottom surface and run through by the bracing post, and an axle strut protruded upward from the bottom surface and located in the housing compartment defining a hinge axis parallel to an axis of the aperture;

a latch portion which includes two clamp jaws, each clamp jaw having a first end hinged on the axle strut and located at a respective one of the two sides of the aperture, and each clamp jaw having a sloped surface at a respective second end, the sloped surfaces forming a V-shaped latch portion between the second ends of the two clamp jaws, the two clamp jaws including a fixed position intruding into the aperture and a release position escaping from the aperture;

an elastic portion compressed inside the housing compartment, the elastic portion including two elastic elements respectively located at the two sides of the aperture and two ends of each elastic element respectively attached to a respective one of the clamp jaws on a side opposite the aperture and the housing compartment to give the latch portion a clipping force to push the two clamp jaws to the fixed position; and a press portion which is inserted into the housing compartment from an exterior of the mounting seat to contact the two clamp jaws at an opening of the V-shaped latch portion and depressible to push the two clamp jaws to the release position.

2. The fast disassembly fastening apparatus of claim 1, wherein the mounting seat includes a cap and a base latched together, the housing compartment being formed on the base and sealed by the cap, the cap and the base including respectively an opening corresponding to each other to form the aperture, the base including a notch at one side run through by the press portion.

3. The fast disassembly fastening apparatus of claim 2, wherein the cap and the base include respectively at least one latch strut and at least one latch cavity mating each other for latching together.

4. The fast disassembly fastening apparatus of claim 1, wherein the housing compartment and one of the two clamp jaws include respectively a recess and a cavity to hold one of the two elastic elements.

5. The fast disassembly fastening apparatus of claim 1, wherein one of the two clamp jaws includes an arched latch basin facing one side of the aperture.

6. The fast disassembly fastening apparatus of claim 5, wherein the latch basin includes a latch thread.

7. The fast disassembly fastening apparatus of claim 1, wherein the press portion includes two latch flanges at two ends, the housing compartment including two latch recesses corresponding to the two latch flanges for latching thereof.

8. The fast disassembly fastening apparatus of claim 1, wherein the press portion includes a guide slot and the mounting seat includes a guide strut mating and inserting into the guide slot.

* * * * *